US012408202B2

(12) United States Patent
Meier et al.

(10) Patent No.: US 12,408,202 B2
(45) Date of Patent: Sep. 2, 2025

(54) SECURE COMMUNICATION ACCELERATION USING A FRAME CLASSIFIER

(71) Applicant: Infineon Technologies AG, Neubiberg (DE)

(72) Inventors: Manuela Meier, Munich (DE); Longli Yu, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 298 days.

(21) Appl. No.: 17/816,571

(22) Filed: Aug. 1, 2022

(65) Prior Publication Data

US 2024/0040619 A1    Feb. 1, 2024

(51) Int. Cl.
*H04W 74/0816*    (2024.01)
*H04W 72/0446*    (2023.01)
*H04W 72/0453*    (2023.01)

(52) U.S. Cl.
CPC ... *H04W 74/0816* (2013.01); *H04W 72/0446* (2013.01); *H04W 72/0453* (2013.01)

(58) Field of Classification Search
CPC ......... H04W 74/0816; H04W 72/0446; H04W 72/0453; H04L 63/123; H04L 69/22; H04L 63/205; H04L 67/12; H04L 69/06; H04L 69/18
USPC ......................................................... 370/329
See application file for complete search history.

(56) References Cited

U.S. PATENT DOCUMENTS

| | | | |
|---|---|---|---|
| 2006/0002386 A1* | 1/2006 | Yik | H04L 49/3063 370/469 |
| 2009/0282167 A1* | 11/2009 | Dai | H04L 49/3009 707/E17.014 |
| 2014/0157405 A1* | 6/2014 | Joll | H04L 63/1425 726/22 |
| 2016/0315853 A1* | 10/2016 | Liste | H04L 63/10 |
| 2017/0013508 A1* | 1/2017 | Pallas | H04W 28/088 |
| 2019/0363843 A1* | 11/2019 | Gordaychik | H04W 72/044 |
| 2020/0136971 A1* | 4/2020 | Cohen | H04L 9/0643 |
| 2020/0274704 A1* | 8/2020 | Matsui | H04L 9/0833 |

* cited by examiner

*Primary Examiner* — Khaled M Kassim
*Assistant Examiner* — Oladiran Gideon Olaleye
(74) *Attorney, Agent, or Firm* — Harrity & Harrity, LLP

(57) ABSTRACT

In some implementations, a device may identify a set of characteristics of a frame. The device may compute a first key index associated with the frame based on the set of characteristics and using a first key index function. The device may determine whether the first key index is associated with any collision entries from a set of collision entries. The device may determine a set of security parameters associated with the frame using a particular key index. The particular key index is either the first key index when the first key index is not associated with any collision entries from the set of collision entries, or is a second key index when the first key index is associated with a collision entry from the set of collision entries.

20 Claims, 7 Drawing Sheets

SECURE COMMUNICATION ACCELERATION USING A FRAME CLASSIFIER

BACKGROUND

Security is an ever-growing challenge for in-vehicle communications. For example, a degree of difficulty for an attacker to access, disrupt, or otherwise impair a vehicle function should be as high as possible. As another example, customer-specific and private data should be protected from access by an attacker. Ethernet is used as a communication interface in a variety of applications, such as in-vehicle communications. Ethernet protocol standards that provide security for in-vehicle communications are diverse, and there are different security protocols at different Ethernet layers, such as medium access control security (MACsec), Internet protocol security (IPsec), transport layer security (TLS), and datagram TLS (DTLS).

SUMMARY

In some implementations, a device includes one or more processors configured to: identify a set of characteristics of a frame; compute a first key index associated with the frame based on the set of characteristics and using a first key index function; determine whether the first key index is associated with any collision entries from a set of collision entries; and determine a set of security parameters associated with the frame using a particular key index, wherein the particular key index is either: the first key index when the first key index is not associated with any collision entries from the set of collision entries, or a second key index when the first key index is associated with a collision entry from the set of collision entries.

In some implementations, a device includes one or more processors configured to: identify a set of characteristics associated with a frame; compute a flow identifier associated with the frame based on the set of characteristics; determine a key index associated with the frame; determine a stored flow identifier corresponding to the key index; and selectively accept the frame based on a determination of whether the computed flow identifier matches the stored flow identifier.

In some implementations, a method includes identifying, by a device, a set of characteristics of a frame; computing, by the device, a first index associated with the frame based on the set of characteristics and using a first index function; determining, by the device, whether the first index is associated with any collision entries from a set of collision entries; and determining, by the device, a set of parameters associated with the frame using a particular index, wherein the particular index is either: the first index when the first index is not associated with any collision entries from the set of collision entries, or a second index when the first index is associated with a collision entry from the set of collision entries.

DETAILED DESCRIPTION

Figure 1A:
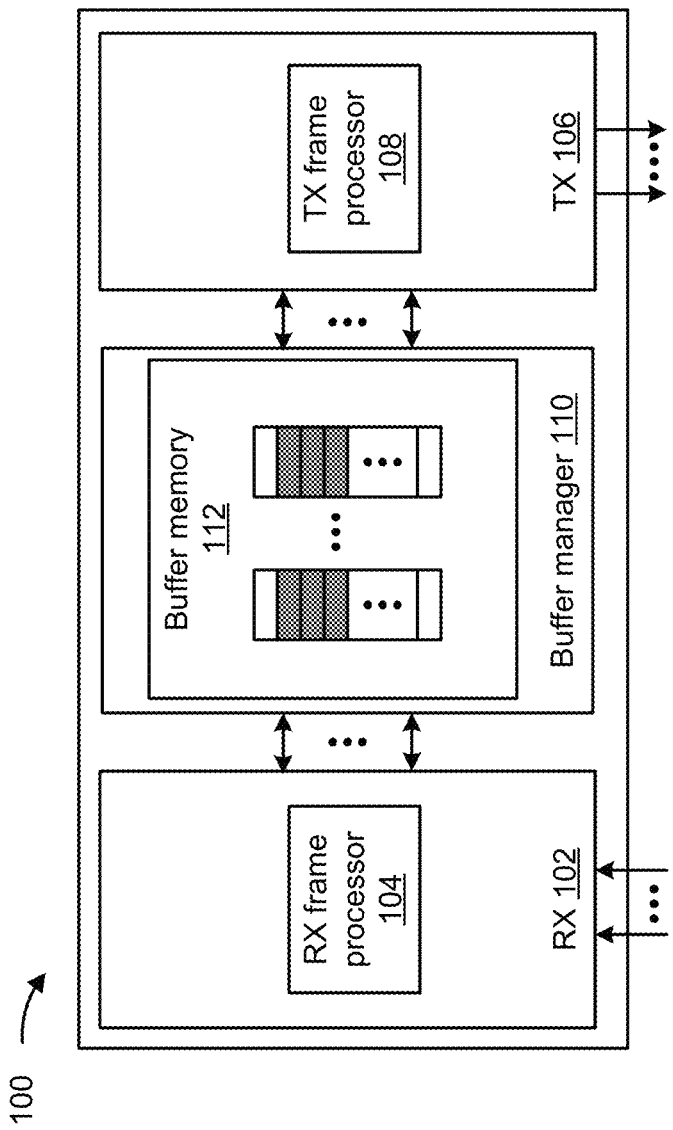
FIGS. 1A-1C are diagrams illustrating an example of a switch that provides secure communication acceleration using a frame classifier, in accordance with aspects of the present disclosure.

The following detailed description of example implementations refers to the accompanying drawings. The same reference numbers in different drawings may identify the same or similar elements.

As noted above, Ethernet protocol standards that provide security for in-vehicle communications are diverse, and there are different security protocols at different Ethernet layers, such as MACsec at layer 2 (L2), IPsec at layer 3 (L3), and TLS/DTLS at layer 4 (L4). In practice, security function acceleration in hardware for these Ethernet security protocols (particularly IPsec and TLS/DTLS) is complex. Additionally, as Ethernet speeds increase (e.g., up to 25 gigabits per second (Gbps)), secure communication implementation (e.g., at a master control unit (MCU), a master processing unit (MPU), or the like) becomes increasingly more complex and challenging for these Ethernet security protocols.

One technique for providing secure Ethernet communication is to use a central processing unit (CPU) and a security algorithm accelerator. According to this technique, the CPU is responsible for Ethernet protocol processing. In general, the CPU parses Ethernet frame headers (e.g., MAC layer headers, IP layer headers, transmission control protocol (TCP) layer headers, user datagram protocol (UDP) layers header, or the like) as a preprocessing step. Next, the CPU sets up a security context consisting of security parameters (e.g., a security key in the security algorithm accelerator), triggers a direct memory access (DMA) component and the security algorithm accelerator for frame decryption or authentication checking, and then performs post-processing after the security algorithm accelerator completes security algorithm processing. One advantage of this technique is that the technique uses a unified hardware solution and simplifies hardware implementation, meaning that the same set of hardware components (e.g., the CPU, the security algorithm accelerator, the DMA component) is used for all of the Ethernet security protocols (MACsec, IPsec, and TLS/DTLS). However, this technique puts a significant load on the CPU and, therefore, performance of secure communication is limited. As Ethernet speeds increase (e.g., to 10 Gbps and higher) interface and secure communication performance becomes even more demanding on the CPU.

An Ethernet switch (sometimes referred to as an Ethernet bridge) typically includes a component that capable of performing frame parsing and frame classification. Such a component is herein referred to as a frame parser. In general a frame classifier is capable of parsing a frame header to determine one or more characteristics of a frame (e.g., a MAC source address, a MAC destination address, a frame type, an association number (AN), an IP source address, an IP destination address, a protocol, TCP/UDP port information, or the like). Typically, the frame classifier determines whether some predefined combination of characteristic exists in the characteristics of the frame (e.g., a particular source address with a particular protocol), and generates a label for the frame based on the determined predefined combination. The frame classifier may be configured to label the frame with a particular category (sometimes referred to as a classification queue or stream), and then store or link the frame with other frames belonging to the same category. Frame classification enables quality of service (QoS) by, for example, allowing priority to be given to a particular frame category for further processing. Additionally, frame classification can increase a speed of frame routing (e.g., frames of a particular category received on a particular port can be directly routed to other interfaces, such as a controller area network (CAN) or another port).

Further, in some systems, characteristics of a frame can be used in conjunction with a lookup table that stores security key indices. For example, a lookup table can be configured such that security key indices are each associated with one or more particular frame characteristics, such as a source address, a destination address, an AN, or the like. Here, using the lookup table, characteristics of a given frame can be used to determine a security key index for the given frame. The security key index may then be used to determine a set of security parameters for the given frame. Such operation can serve to reduce load on the CPU (e.g., as compared to the unified hardware technique described above). However, a number of Ethernet connections (e.g., at L2, L3, and/or L4) in a given system (e.g., an in-vehicle system) may be in the range of hundreds or even thousands. As a result, the lookup table may need to be undesirably large in terms of area cost for memory. For example, the lookup table may in some cases be implemented using a ternary content addressable memory (TCAM), which provides fast lookup but is expensive in terms of area cost. Alternatively, the lookup table could be implemented using a bit wise decision tree, which can reduce area cost but has a reduced lookup speed. Therefore, use of the lookup table in this manner may be impractical, regardless of the implementation of the lookup table.

Some aspects described herein provide techniques and apparatuses for secure communication acceleration using a frame classifier. In some implementations, when a frame classifier parses a frame (for the purpose of classification), the frame classifier may additionally determine and process a set of security parameters based on characteristics associated with the frame (e.g., such that the set of security parameters can readily be used by a security algorithm accelerator). More specifically, in some implementations, a device (e.g., a switch including a frame classifier) may identify a set of characteristics of a frame and may compute a first key index associated with the frame based on the set of characteristics and using a first key index function. The device may determine whether the first key index is associated with any collision entries from a set of collision entries, and may determine a set of security parameters associated with the frame using a particular key index. Here, the particular key index is either the first key index (e.g., when the first key index is not associated with any collision entries from the set of collision entries) or is a second key index (e.g., when the first key index is associated with a collision entry from the set of collision entries). Notably, a given frame is parsed only once according to the techniques and apparatuses described herein. In this way, a security-related output from the frame classifier can be used (e.g., by software, directly in hardware) to trigger processing by a security algorithm accelerator, while reducing CPU load and/or usage of software resources in association with providing secure communication. Additional details are provided below.

Figure 1B:
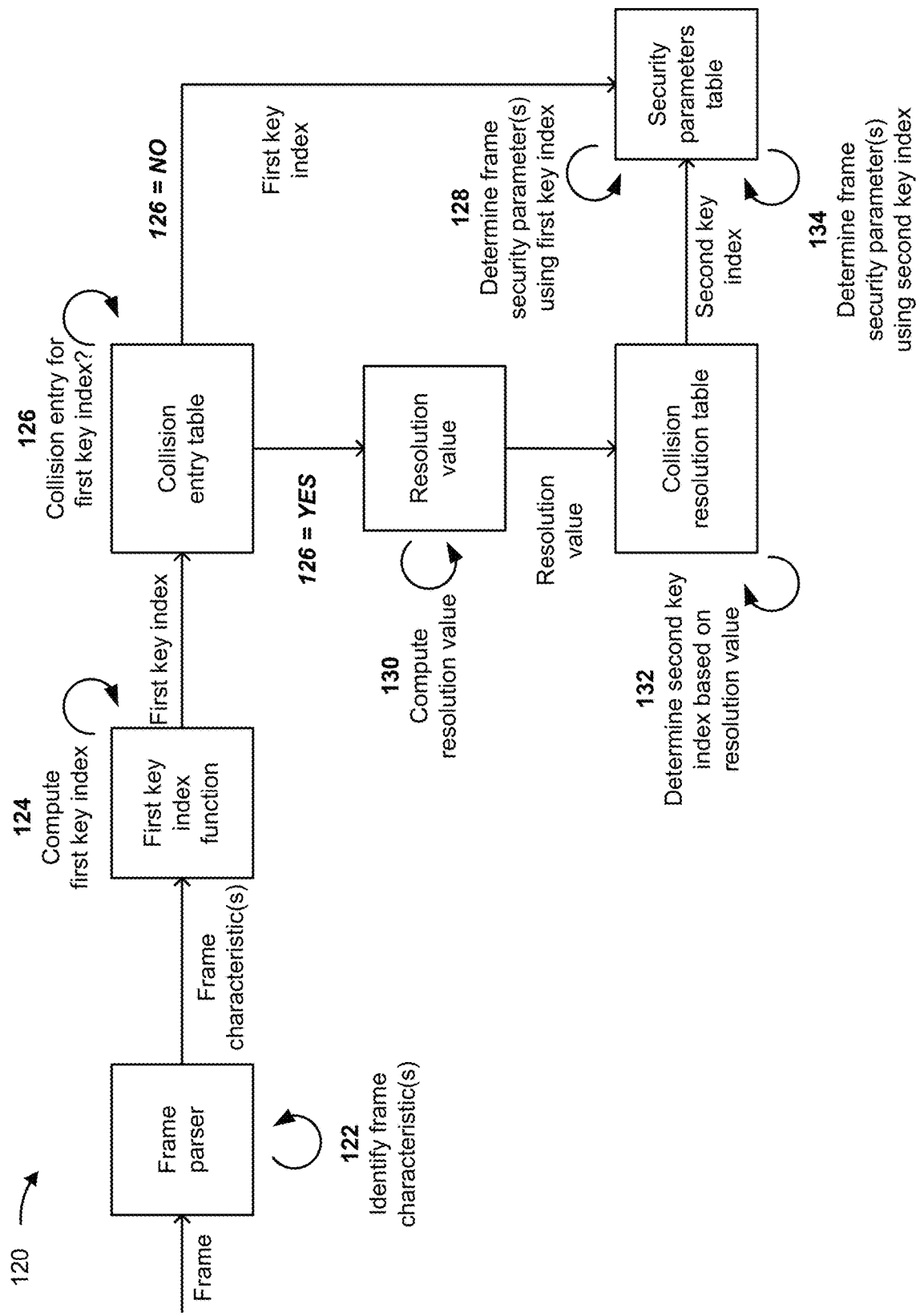
Figure 1C:
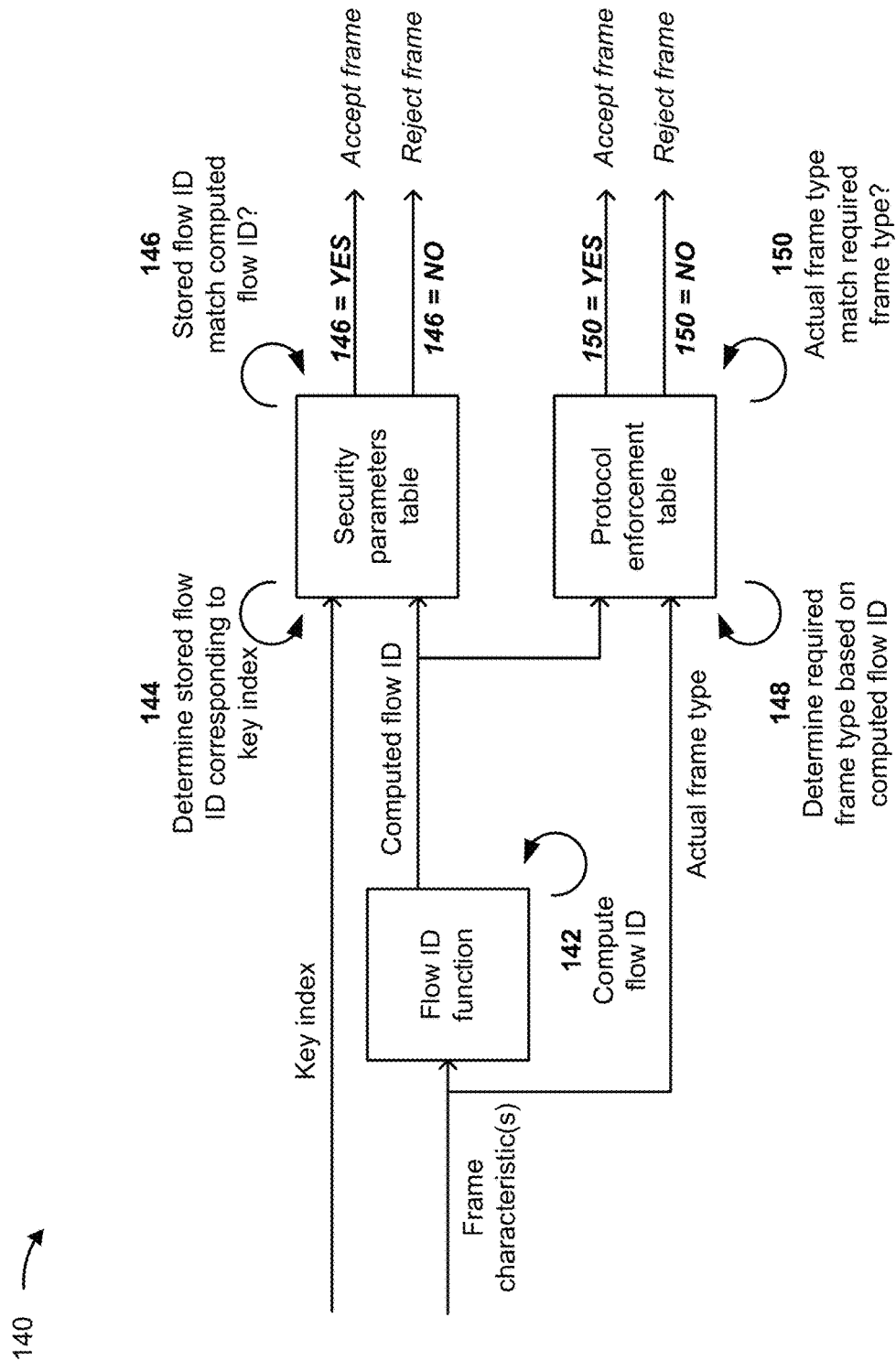

FIGS. 1A-1C are diagrams associated with an example of a switch 100 that provides secure communication acceleration using a frame classifier, as described herein. The switch 100 may be, for example, an Ethernet switch or bridge. In some implementations, the switch 100 may be included in a communications system, such as an in-vehicle communications system. As shown in FIG. 1A, the switch 100 may include an RX component 102 including an RX frame processor 104, a TX component 106 including a TX frame processor 108, and a buffer manager 110 including a buffer memory 112. The components of the switch 100 are described below, followed by a description of example operation of the switch 100 in association with providing secure communication acceleration using a frame classifier.

RX component 102 includes one or more components associated with receiving frames at switch 100 and processing the frames received at switch 100. In some implementations, RX component 102 includes one or more ports (e.g., one or more MAC ports, not shown in FIG. 1A) via which frames can be received at switch 100. As shown, RX component 102 includes RX frame processor 104.

RX frame processor 104 includes one or more components associated with processing frames received at switch 100. That is, RX frame processor 104 may include one or more components to process frames received via the ports of RX component 102. The one or more components of the RX frame processor 104 may include, for example, an RX multiplexer (e.g., a time-division RX multiplexer), a frame enqueue component, a header/data extractor component, a frame classifier (e.g., a component capable of performing frame parsing and frame classification), a lookup parameter memory, a parser microcode memory, a cryptographic frame enqueue component, a cryptographic frame processor, a cryptographic engine, a security parameter memory, or another type of component associated with processing a frame received at switch 100. In some implementations, one or more components of the RX frame processor 104 may perform operations associated with secure communication acceleration using a frame classifier, as described herein.

TX component 106 includes one or more components associated with processing frames to be transmitted by switch 100 and processing the frames to be transmitted by switch 100. In some implementations, TX component 106 includes one or more ports (e.g., one or more MAC ports, not shown in FIG. 1A) via which frames can be transmitted by switch 100. In some implementations, one or more ports of switch 100 may be used for reception and for transmission. For example, a given MAC port of switch 100 may be a TX/RX port via which frames can be transmitted or received. As shown, TX component 106 includes TX frame processor 108.

TX frame processor 108 includes one or more components associated with processing frames to be transmitted by switch 100. That is, TX frame processor 108 may include one or more components to process frames to be transmitted via the ports of the TX component 106. The one or more components of the TX frame processor 108 may include, for example, a TX demultiplexer (e.g., a time division TX demultiplexer), a frame dequeue component, a scheduler component (e.g., a time sensitive networking (TSN)/shaper/scheduler), a cryptographic frame enqueue/dequeue component, a cryptographic engine, a security parameter memory, or another type of component associated with processing a frame to be transmitted by switch 100.

Buffer manager 110 includes one or more components to provide buffer management at switch 100. For example, in some implementations, buffer manager 110 may obtain a frame and may store the frame in buffer memory 112 or cause the frame to be stored in buffer memory 112. Here, the frame may be a frame that was received via a port of switch 100 or may be a frame that is to be transmitted via a port of switch 100. As shown, buffer manager 110 may include (or be communicatively coupled to) buffer memory 112. Buffer memory 112 includes one or more memory components to buffer frames received via ports of switch 100 or frames to be transmitted via ports of switch 100. In some implementations, buffering provided by buffer memory 112 is managed or controlled by buffer manager 110.

FIG. 1B is a diagram illustrating an example 120 of switch 100 determining a set of security parameters using a key index computed based at least in part on one or more characteristics of a frame. In some implementations, the operations shown in example 100 may be performed by one or more components of RX 102 of switch 100, such as by RX frame processor 104 or one or more components of RX frame processor 104 (e.g., a frame classifier of RX frame processor 104). Notably, while example 120 is described in the context of key indices and a set of security parameters, the operations shown in example 120 are generally applicable to the computation or determination of any other type of index or other type of parameter.

As shown in FIG. 1B by reference 122, the switch 100 may identify a set of characteristics associated with a frame. For example, the switch 100 may receive a frame (e.g., at RX 102), and may (e.g., using a frame classifier of RX processor 104) parse or otherwise process the frame to determine a set of characteristic associated with the frame. The set of characteristics of the frame may include, for example, a MAC source address associated with the frame, a MAC destination address associated with the frame, a frame type, an AN associated with the frame, an IP source address associated with the frame, an IP destination address associated with the frame, a protocol associated with the frame, or TCP/UDP port information associated with the frame, among other examples.

As shown by reference 124, the switch 100 may compute a first key index associated with the frame based on the set of characteristics and using a first key index function. For example, the switch 100 may provide the set of characteristics as input to the first key index function, and may receive the first key index as an output of the first key index function. Thus, the first key index is a function of the set of characteristics of the frame. In some implementations, the first key index function includes a hash function. In some implementations, the first key index function includes a cyclic redundancy check (CRC) function. In some implementations, the first key index function includes a truncation function.

A key index is an index value based on which the switch 100 may determine a set of security parameters. For example, in some implementations, the switch 100 may use a key index to perform a lookup for a set of security parameters for a frame. That is, the switch 100 may in some implementations perform a security parameter lookup using a key index value associated with the frame (rather than performing the lookup based on one or more frame characteristics themselves). In some implementations, use of the key index in association with determining the set of frame characteristics (rather than the frame characteristics themselves) enables faster lookup and reduces area cost of the lookup table since the lookup table needs to be configured with key indices (rather than storing one or more frame characteristics). In some implementations, the use of a hash function or a CRC function reduces or eliminates a restriction against the setup of network addresses (e.g., as compared to the use of a truncation function).

As shown by reference 126, the switch 100 may determine whether the first key index is associated with any collision entries from a set of collision entries (e.g., in a collision entry table). A collision entry is an item of information indicating whether a given key index, computed using the first key index function based on a first set of frame characteristics, could match another key index computed using the first key index function based on a second (different) set of frame characteristics. That is, a collision entry indicates whether the same key index could be computed for two frames having different characteristics (such that the key indices of the two frames "collide").

In some implementations, the switch 100 may store or have access to a collision entry table that stores collision entries. In some implementations, the collision entry table may be generated and stored during network setup (e.g., based on known characteristics of the network, such as known MAC addresses, IP addresses, or the like). In such a case, software can use the first key index function to compute key indices and identify collisions. Additionally, or alternatively, the collision entry table can be generated or updated during operation. For example, if a characteristic (e.g., a MAC address, an IP address, or the like) of the network is added or modified, then software can compute updated or additional key indices and identify any collisions, and update the collision entry table accordingly. In some implementations, the switch 100 may determine whether a collision entry table associated with the first key index exists within the collision entry table.

In some implementations, the switch 100 may determine a set of security parameters associated with the frame based on whether the first key index is associated with any collision entries from a set of collision entries. For example, if the switch 100 determines that the first key index is not associated with any collision entries from the set of collision entries (126=NO), then the switch 100 may determine the set of security parameters associated with the frame using the first key index, as shown by reference 128. That is, if the first key index is not associated with a collision entry, then the switch 100 may perform a lookup in a security parameters table using the first key index, with a result of the lookup being the set of security parameters associated with the frame.

Alternatively, if the switch 100 determines that the first key index is associated with a collision entry from the set of collision entries (126=YES), then the switch 100 may determine the set of security parameters associated with the frame using a second key index. In some implementations, as shown by reference 130, if the switch 100 determines that the first key index is associated with a collision entry from the set of collision entries, then the switch 100 may compute a resolution value. In some implementations, the switch 100 computes the resolution value based on one or more characteristics of the frame. The resolution value is a value based on which the switch 100 can resolve the collision associated with the first index value.

In some implementations, the switch 100 may compute the resolution value using a second key index function (e.g., a key index function that is different from the first key index function). Here, the switch 100 may provide the one or more characteristics as input to the second key index function, and may receive the resolution value as an output of the second key index function. In some implementations, the second key index function may include a hash function. In some implementations, the second key index function may include a CRC function. In some implementations, the one or more characteristics of the frame based on which the switch 100 computes the resolution value using the second key index function may be the same as the set of characteristics used to compute the first key index. Alternatively, the one or more characteristics of the frame based on which the switch 100 computes the resolution value using the second key index function may be different from the set of characteristics used to compute the first key index (e.g., the one or more characteristics may be a subset of the set of characteristics or may include one or more characteristics not included in the set of characteristics). Notably, a likelihood of a collision among key indices computed using the first key index function is low, and a likelihood of a collision among resolution values computed using the second index function is extremely low since, in practice, few collisions will need to be resolved, thereby reducing a likelihood of collisions.

In some implementations, the switch 100 may compute the resolution value based on identifying a slice from the one or more characteristics according to a slice offset. A slice may include, for example, an item of information from a frame characteristic, with the offset defining a start or end of the item of information from the frame characteristic. For example, the slice may include a group of bits (e.g., eight bits) from a source MAC address associated with the frame, with the slice offset defining a starting bit of the group of bits within the source MAC address. In this example, the resolution value is the group of bits from the MAC address, with the group of bits being identified according to the slice offset.

As shown by reference 132, the switch 100 may then determine the second key index based on the resolution value. For example, in some implementations, the switch 100 may store or have access to a collision resolution table that stores collision resolution entries, with each collision resolution entry being associated with a stored resolution value and a second key index. Here, the switch 100 may compare the computed resolution value to stored resolution values associated with collision resolution entries in the collision resolution table. By such comparison, the switch 100 can identify a collision resolution entry for which a stored resolution value matches the computed resolution value. The switch 100 may then determine the second key index based on the collision resolution entry. That is, the switch 100 may identify the second key index as a key index associated with the collision resolution entry that includes the stored resolution value that matches the computed resolution value. In some implementations, the collision resolution table may be generated and stored during network setup (e.g., based on known characteristics of the network, such as known MAC addresses, IP addresses, or the like). In such a case, software can use the collision resolution values and second key indices. Additionally, or alternatively, the collision resolution table can be generated or updated operation. For example, if a characteristic (e.g., a MAC address, an IP address, or the like) of the network is added or modified, then software can compute updated or additional collision resolution values or key indices and update the collision resolution table accordingly.

As shown by reference 134, the switch 100 may then determine the set of security parameters associated with the frame based on the second key index. For example, the switch 100 may perform a lookup in the security parameters table using the second key index, with a result of the lookup being the set of security parameters associated with the frame.

Notably, the use of the collision entry table and the collision resolution table reduces area cost (e.g., as compared to using a traditional lookup table). For example, using the collision resolution table can be relatively small in size because a number of collided entries will be small (due to the mathematical properties of the first key index function. As one example, the collision resolution table may be approximately 25% of the size of the collision entry table. In some implementations, a combined size of the collision entry table and the collision resolution table may be significantly less than the conventional lookup table. For example, the combined sized of the collision entry table and the collision resolution table may in some implements be approximately 25 kbit (e.g., as compared to a 300 kbit conventional lookup table).

In a network, such as an Ethernet network, a flow identifier defines a physical connection path between two layers or nodes. In general, the flow identifier is a representation of a combination of source and destination addresses at one or more layers (e.g., L2, L3, or L4). A flow identifier can support detection of whether a frame sent on a given physical connection follows a required security protocol and, therefore, can be used in an intrusion detection and prevention system (IDPS). In some communication systems, such as an in-vehicle communication system, a flow identifier can be determined by, for example, hashing one or more addresses (e.g., one or more MAC addresses or one or more IP addresses) to compress the address into a relatively shorter bit string (e.g., 20 bits). A bit length of a flow identifier may be larger than a key index to provide unique identifier for a given Ethernet connection, while still being shorter than a (concatenated) combination of addresses. In some implementations, the switch 100 may use a flow identifier to verify a key index and/or to provide intrusion detection and prevention functionality.

FIG. 1C is a diagram illustrating an example 140 of switch 100 performing intrusion detection and prevention in association with providing accelerated secure communication. In example 140, the switch 100 has received a frame, determined a set of characteristics of the frame, and a determined a key index associated with the frame (e.g., in a manner similar to that described above with respect to FIG. 1B).

As shown by reference 142, the switch 100 may compute a flow identifier associated with the frame based on one or more characteristics associated with the frame. For example, the switch 100 may provide one or more characteristics associated with the frame as input to a flow identifier function, and may receive the flow identifier as an output of the flow identifier function. In some implementations, as noted above, the flow identifier function includes a hash function, as noted above. In some implementations, the flow identifier function may includes another type of function, such as a CRC function or a truncation function.

As shown by reference 144, the switch 100 may determine a stored flow identifier corresponding to the key index associated with the frame. For example, the switch 100 may store or have access to a security parameters table that stores sets of security parameters, with each set of security parameters being associated with a key index. The switch 100 may then determine, from the security parameters table and using the key index, a set of security parameters corresponding to the key index. Here, the stored flow identifier may be included in the set of security parameters.

As shown by reference 146, the switch 100 may selectively accept the frame based on a determination of whether the computed flow identifier matches the stored flow identifier. For example, the switch 100 may compare the stored flow identifier (i.e., the flow identifier stored in the security parameters table) to the computed flow identifier (i.e., the flow identifier computed by the switch 100) to determine whether the stored flow identifier matches the computed flow identifier. As shown, if the switch 100 determines that the stored flow identifier does not match the computed flow identifier, then the switch 100 may reject the frame (e.g., the switch 100 may determine that the frame is not secure, and may discard the frame). Alternatively, if the switch 100 determines that the stored flow identifier matches the computed flow identifier, then the switch 100 may accept the frame (e.g., the switch 100 may forward the frame or continue processing the frame).

In some implementations, the switch 100 may further provide protocol enforcement for the frame (e.g., to ensure that the frame is a required frame type). For example, as shown by reference 148, the switch 100 may in some implementations determine a required frame type for the frame based on the flow identifier. For example, the switch 100 may store or have access to a protocol enforcement table that stores flow identifiers, with each flow identifier being associated with a required frame type (e.g., such that a required security protocol for each physical connection is indicated in the protocol enforcement table). The switch 100 may then determine, from the protocol enforcement table and using the computed flow identifier, a required frame type corresponding to the flow identifier.

As shown by reference 150, the switch 100 may selectively accept the frame based on a determination of whether an actual frame type matches the required frame type. For example, the set of characteristics determined by the switch 100 may include information that identifies a frame type of the frame (i.e., the actual frame type of the frame), as described above. Thus, the switch 100 may compare the required frame type (i.e., the required frame type indicated in the protocol enforcement table) to the actual frame type to determine whether the actual frame type matches the required frame type. As shown, if the switch 100 determines that the actual frame type does not match the required frame type, then the switch 100 may reject the frame (e.g., the switch 100 may determine that the frame is not secure, and may discard the frame). Alternatively, if the switch 100 determines that the actual frame type matches the required frame type, then the switch 100 may accept the frame (e.g., the switch 100 may forward the frame or continue processing the frame).

In some implementations, the switch 100 may accept the frame when both the stored flow identifier matches the computed identifier and the actual frame type matches the required frame type. Alternatively, the switch 100 may reject the frame when either the stored flow identifier does not match the computed identifier or the actual frame type does not match the required frame type. In this way, the switch 100 may performing intrusion detection and prevention in addition to providing accelerated secure communication, as described herein.

As indicated above, FIGS. 1A-1C are provided as examples. Other examples may differ from what is described with regard to FIGS. 1A-1C. Further, the number and arrangement of components shown in FIG. 1A are provided as an example. In practice, there may be additional components, fewer components, different components, or differently arranged components than those shown in FIGS. 1A-1C. Furthermore, two or more components shown in FIGS. 1A-1C may be implemented within a single component, or a single component shown in FIGS. 1A-1C may be implemented as multiple, distributed components. Additionally, or alternatively, a set of components (e.g., one or more components) of switch 100 may perform one or more functions described as being performed by another set of components of switch 100.

Figure 2:
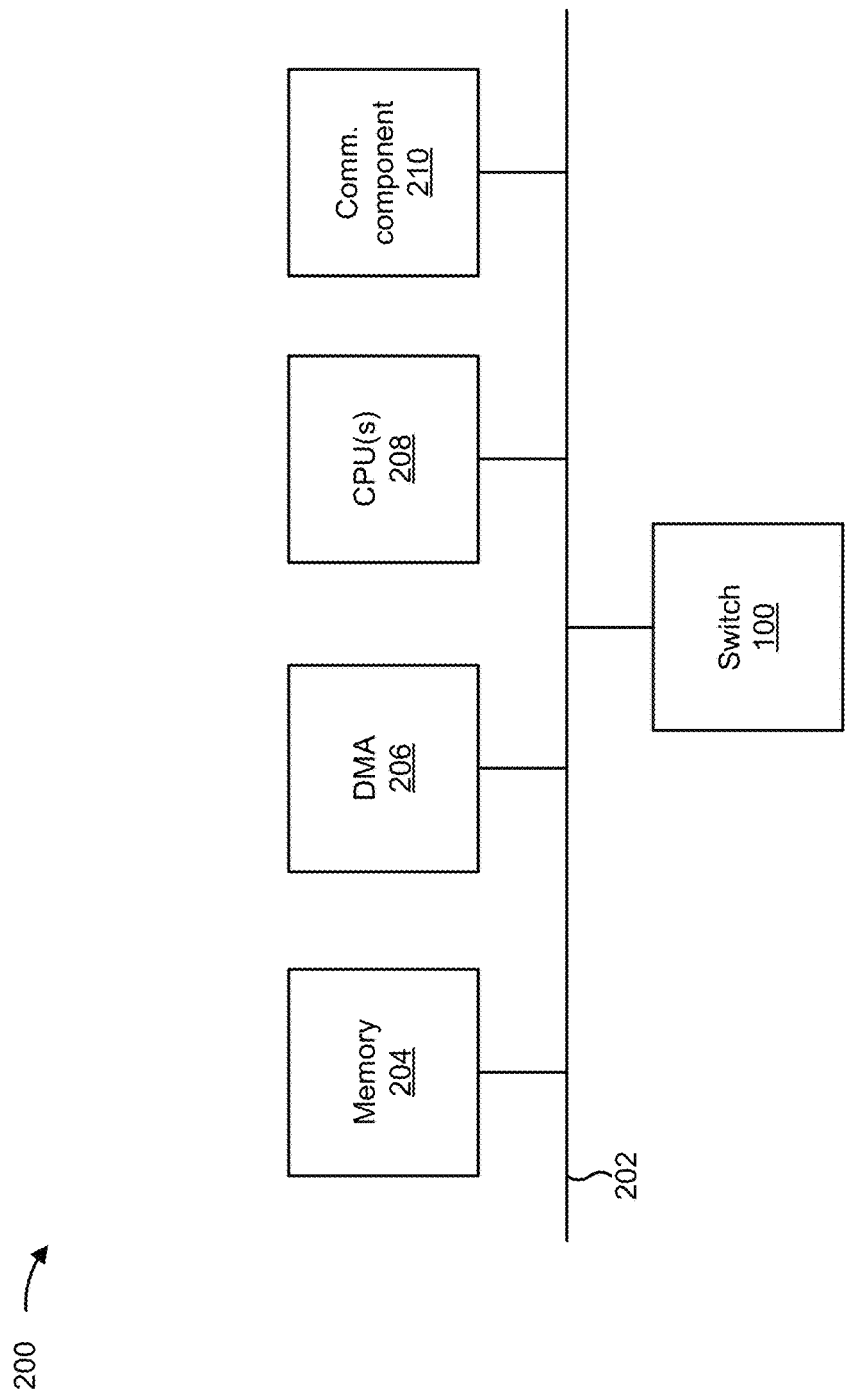
FIG. 2 is a diagram of an example system in which the switch that provides secure communication acceleration using a frame classifier may be implemented, in accordance with aspects of the present disclosure.

FIG. 2 is a diagram of an example system 200 in which a switch 100 may be implemented. In some implementations, system 200 may be a system on a chip (SoC). As shown in FIG. 2, system 200 may include switch 100, as well as a bus 202, a memory 204, a direct memory access (DMA) 206, a central processing unit (CPU) 208, and a communication component 210.

Switch 100 is component to perform operations associated with providing secure communication acceleration using a frame classifier, as described herein. Further details regarding the switch 100 are provided elsewhere herein, such as above with respect to FIGS. 1A-1C.

Bus 202 is a component that enables communication among the components of system 200. For example, bus 202 may enable switch 100 to receive data from memory 204 and/or DMA 206. As another example, bus 202 may enable switch 100 to transmit data to communication component 210.

Memory 204 is a component to store and/or provide data process or to be processed by switch 100. In some implementations, memory 204 may be include a random access memory (RAM), a read only memory (ROM), and/or another type of memory (e.g., a flash memory, a magnetic memory, and/or an optical memory).

DMA 206 is a component to provide data stored by memory 204 to switch 100. In some implementations, DMA 206 provides data stored by memory 204 to switch 100 independent of CPU 208 (i.e., DMA 206 provides direct memory access).

CPU 208 includes a central processing unit, a graphics processing unit, a microprocessor, a controller, a microcontroller, a digital signal processor, a field-programmable gate array, an application-specific integrated circuit, and/or another type of processing component. In some implementations, CPU 208 is implemented in hardware, firmware, or a combination of hardware and software. In some implementations, CPU 208 includes one or more processors capable of being programmed to perform a function.

Communication component 210 includes enables system 200 to communicate with other devices, such as via a wired connection and/or a wireless connection. For example, communication component 210 may include a receiver, a transmitter, a transceiver, a modem, a network interface card, an antenna, and/or the like.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of system 200 may perform one or more functions described as being performed by another set of components of system 200.

Figure 3:
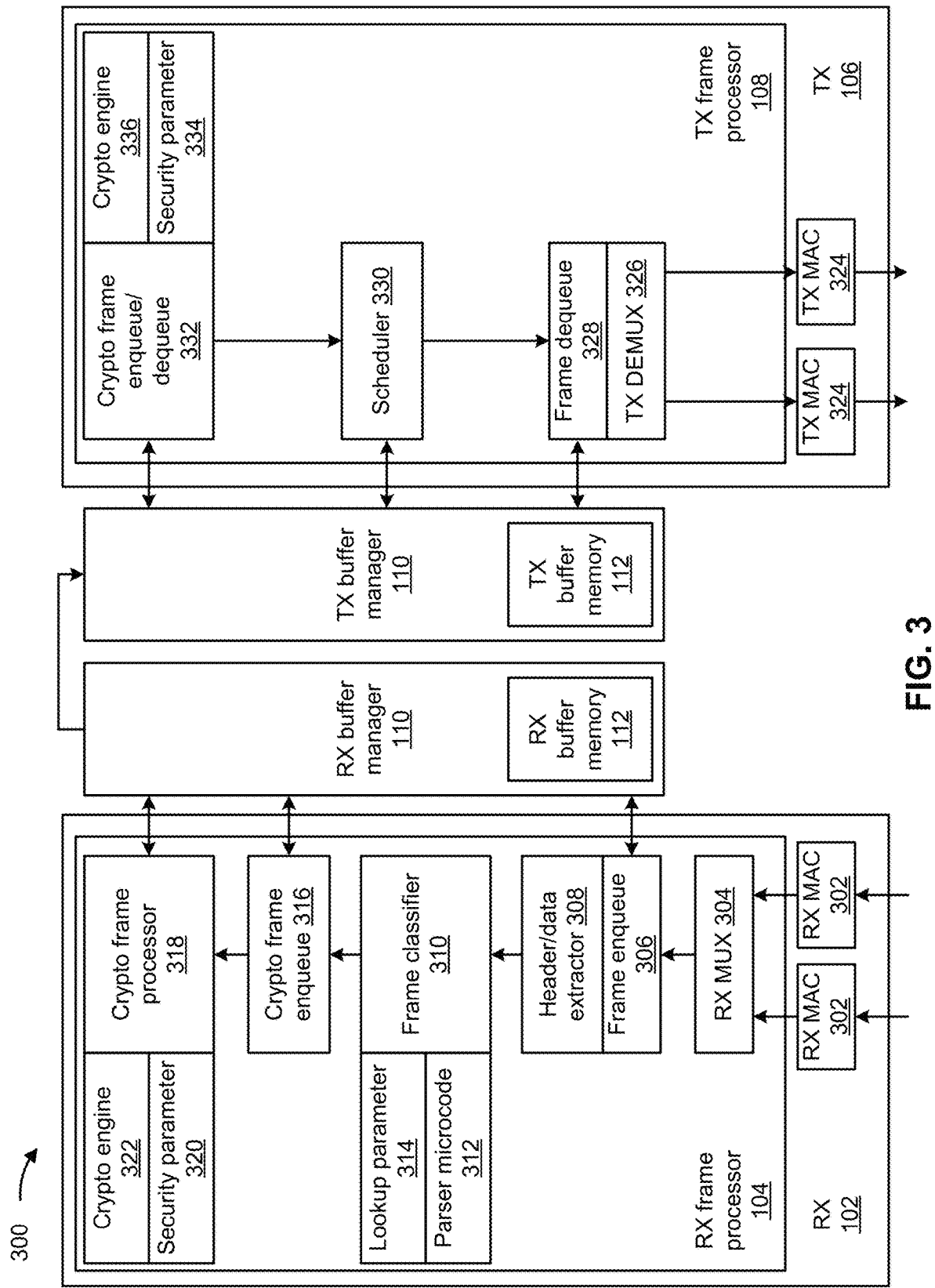
FIG. 3 is a diagram of an example implementation of the switch that provides secure communication acceleration using a frame classifier, in accordance with aspects of the present disclosure.

FIG. 3 is a diagram of an example implementation 300 of switch 100 that provides secure communication acceleration using a frame classifier, in accordance with various aspects of the present disclosure.

As shown in FIG. 3, in example implementation 300 of switch 100, RX component 102 includes a group of RX MAC ports 302, and RX frame processor 104 includes an RX multiplexer 304, a frame enqueue component 306, a header/data extractor component 308, a frame classifier 310, a parser microcode memory 312, a lookup parameter memory 314, a cryptographic frame enqueue component 316, a cryptographic frame processor 318, a security parameter memory 320, and a cryptographic engine 322.

As further shown, TX component 106 includes a group of TX MAC ports 324, and TX frame processor 108 includes a TX demultiplexer 326, a frame dequeue component 328, a scheduler component 330, a cryptographic frame enqueue/dequeue component 332, a security parameter memory 334, and a cryptographic engine 336. Notably, the components of example implementation 300 are provided for illustrative purposes, and TX/RX implementation in a given switch 100 may differ than that shown in FIG. 3 to account for different requirements or design targets.

As further shown, in example implementation 300, buffer manager 110 may include a component that provides buffer management for frames received by switch 100 (identified as RX buffer manager 110), and a component that provides buffer management for frames to be transmitted by switch 100 (identified as TX buffer manager 110). As further shown, buffer memory 112 may include a buffer memory for frames received by switch 100 (identified as RX buffer memory 112), and a buffer memory for frames to be transmitted by switch 100 (identified as TX buffer memory 112).

As indicated above, FIG. 3 is provided as an example. Other examples may differ from what is described with regard to FIG. 3. Further, the number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) of switch 100 may perform one or more functions described as being performed by another set of components of switch 100.

Figure 4:
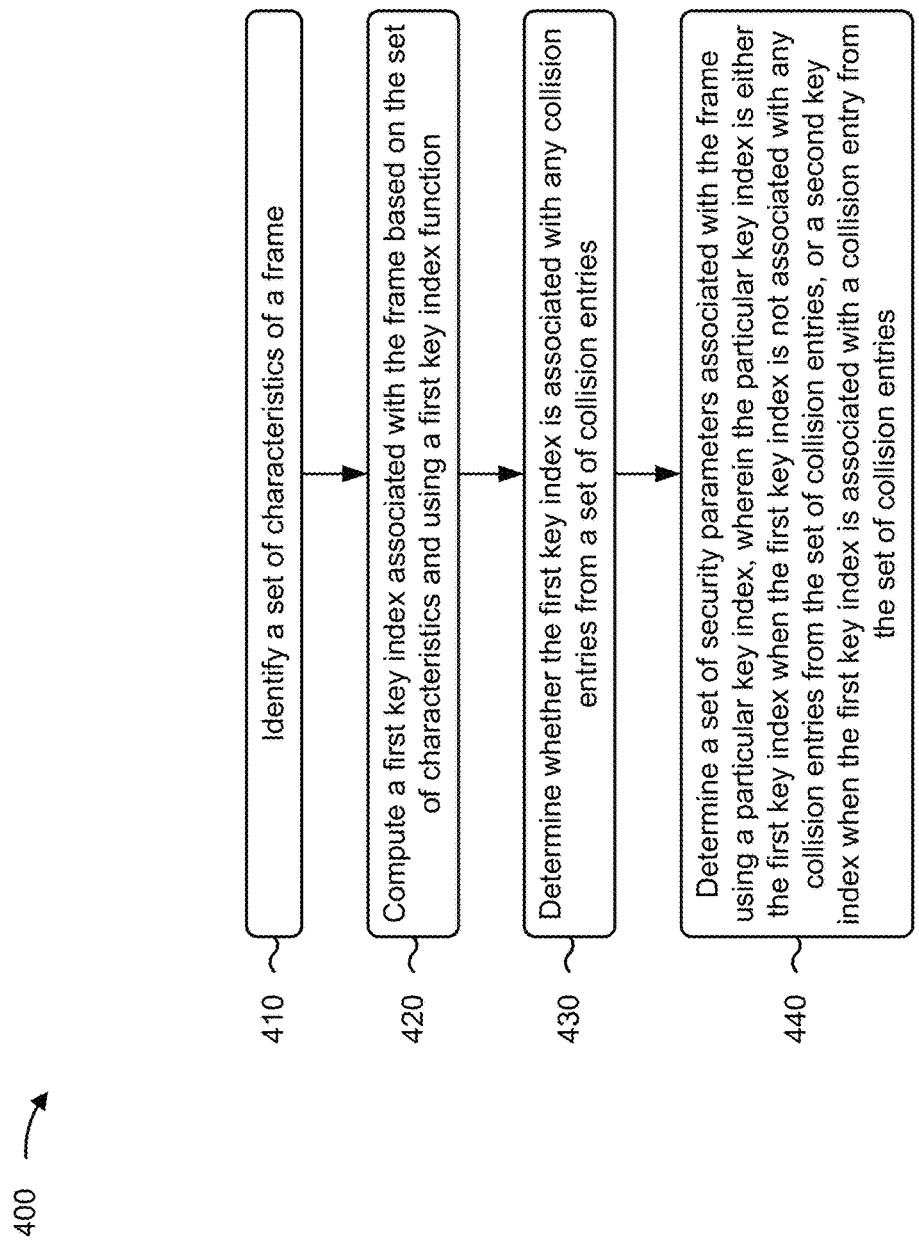
FIGS. 4 and 5 are flowcharts of example processes relating to providing secure communication acceleration using a frame classifier, in accordance with aspects of the present disclosure.

FIG. 4 is a flowchart of an example process 400 associated with secure communication acceleration using a frame classifier. In some implementations, one or more process blocks of FIG. 4 are performed by one or more components of a system 200. For example, one or more process blocks of FIG. 4 may be performed by one or more components of a switch 100, such as RX component 102 (e.g., RX frame processor 104). Additionally, or alternatively, one or more process blocks may be performed by another component or a group of components separate from or including the switch 100, such as a memory 204, a DMA 206, a CPU 208, and/or a communication component 210.

As shown in FIG. 4, process 400 may include identifying a set of characteristics of a frame (block 410). For example, a switch (e.g., the switch 100) may identify a set of characteristics of a frame, as described above.

As further shown in FIG. 4, process 400 may include computing a first key index associated with the frame based on the set of characteristics and using a first key index function (block 420). For example, the switch may compute a first key index associated with the frame based on the set of characteristics and using a first key index function, as described above.

As further shown in FIG. 4, process 400 may include determining whether the first key index is associated with any collision entries from a set of collision entries (block 430). For example, the switch may determine whether the first key index is associated with any collision entries from a set of collision entries, as described above.

As further shown in FIG. 4, process 400 may include determining a set of security parameters associated with the frame using a particular key index, wherein the particular key index is either the first key index when the first key index is not associated with any collision entries from the set of collision entries, or a second key index when the first key index is associated with a collision entry from the set of collision entries (block 440). For example, the switch may determine a set of security parameters associated with the frame using a particular key index, wherein the particular key index is either the first key index when the first key index is not associated with any collision entries from the set of collision entries, or a second key index when the first key index is associated with a collision entry from the set of collision entries, as described above.

Process 400 may include additional implementations, such as any single implementation or any combination of implementations described below and/or in connection with one or more other processes described elsewhere herein.

In a first implementation, the first key index function includes at least one of a hash function, a cyclic redundancy check function, or a truncation function.

In a second implementation, alone or in combination with the first implementation, process 400 includes computing a resolution value associated with the frame based on one or more characteristics of the frame, determining that the resolution value matches a stored resolution value corresponding to a collision resolution entry, determining the second key index based on the collision resolution entry, and determining the set of security parameters associated with the frame based on the second key index.

In a third implementation, alone or in combination the second implementation, when computing the resolution value, process 400 includes computing the resolution value based on the one or more characteristics and using a second key index function that is different from the first key index function.

In a fourth implementation, in combination with the third implementation, the second key index function includes at least one of a hash function or a cyclic redundancy check function.

In a fifth implementation, in combination with one or more of the second through fourth implementations, when computing the resolution value, process 400 includes computing the resolution value based on identifying a slice from the one or more characteristics according to a slice offset.

In a sixth implementation, alone or in combination with one or more of the fourth and fifth implementations, process 400 includes computing a flow identifier associated with the frame, determining a stored flow identifier corresponding to the particular key index, and selectively accepting the frame based on a determination of whether the computed flow identifier matches the stored flow identifier.

In a seventh implementation, alone or in combination with one or more of the first through sixth implementations, process 400 includes computing a flow identifier associated with the frame, determining a required frame type for the frame based on the flow identifier, identifying an actual frame type of the frame, and selectively accepting the frame based on a determination of whether the actual frame type matches the required frame type.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

Figure 5:
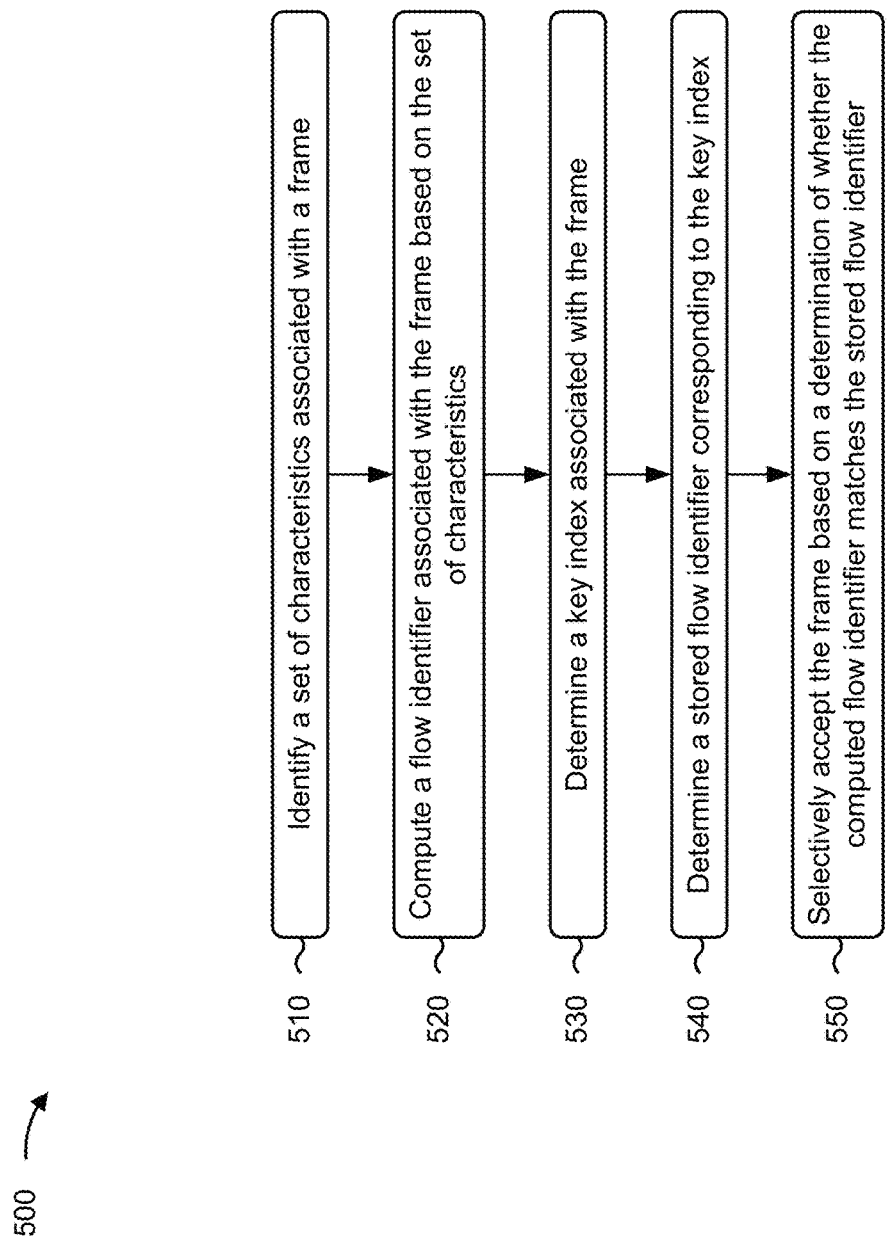

FIG. 5 is a flowchart of an example process 500 associated with secure communication acceleration using a frame classifier. In some implementations, one or more process blocks of FIG. 5 are performed by one or more components of a system 200. For example, one or more process blocks of FIG. 5 may be performed by one or more components of a switch 100, such as RX component 102 (e.g., RX frame processor 104). Additionally, or alternatively, one or more process blocks may be performed by another component or a group of components separate from or including the switch 100, such as a memory 204, a DMA 206, a CPU 208, and/or a communication component 210.

As shown in FIG. 5, process 500 may include identifying a set of characteristics associated with a frame (block 510). For example, the switch (e.g., the switch 100) may identify a set of characteristics associated with a frame, as described above.

As further shown in FIG. 5, process 500 may include computing a flow identifier associated with the frame based on the set of characteristics (block 520). For example, the switch may compute a flow identifier associated with the frame based on the set of characteristics, as described above.

As further shown in FIG. 5, process 500 may include determining a key index associated with the frame (block 530). For example, the switch may determine a key index associated with the frame, as described above.

As further shown in FIG. 5, process 500 may include determining a stored flow identifier corresponding to the key index (block 540). For example, the switch may determine a stored flow identifier corresponding to the key index, as described above.

As further shown in FIG. 5, process 500 may include selectively accepting the frame based on a determination of whether the computed flow identifier matches the stored flow identifier (block 550). For example, the switch may selectively accept the frame based on a determination of whether the computed flow identifier matches the stored flow identifier, as described above.

Process 500 may include additional implementations, such as any single implementation or any combination of implementations described below and/or in connection with one or more other processes described elsewhere herein.

In a first implementation, process 500 includes determining a required frame type for the frame based on the flow identifier, identifying an actual frame type of the frame, and selectively accepting the frame based on a determination of whether the actual frame type matches the required frame type.

In a second implementation, alone or in combination with the first implementation, process 500 includes computing a first key index based on one or more characteristics of the frame and using a first key index function, determining whether the first key index is associated with any collision entries from a set of collision entries, and determining the key index as a particular key index, wherein the particular key index is either the first key index when the first key index is not associated with any collision entries from the set of collision entries, or a second key index when the first key index is associated with a collision entry from the set of collision entries.

In a third implementation, in combination with the second implementation, process 500 includes determining a set of security parameters associated with the frame using the particular key index.

In a fourth implementation, in combination with one or more of the second and third implementations, the first key index function includes at least one of a hash function, a cyclic redundancy check function, or a truncation function.

In a fifth implementation, in combination with one or more of the second through fourth implementations, process 500 includes computing a resolution value associated with the frame based on at least one characteristic of the frame, determining that the resolution value matches a stored resolution value corresponding to a collision resolution entry, determining the second index based on the collision resolution entry, and determining the set of security parameters associated with the frame based on the second key index.

In a sixth implementation, in combination with the fifth implementation, when computing the resolution value, process 500 includes computing the resolution value based on the at least one characteristic and using a second key index function that is different from the first key index function.

In a seventh implementation, in combination with one or more of the fifth and sixth implementations, when computing the resolution value, process 500 includes computing the resolution value based on identifying a slice from the at least one characteristic according to a slice offset.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more processors configured to:
   identify a set of characteristics of a frame;
   compute a first key index associated with the frame based on the set of characteristics and using a first key index function;
   determine whether the first key index is associated with any collision entries from a set of collision entries of a collision entry table,
   wherein the set of collision entries are generated and stored,
   wherein a collision entry, of the set of collision entries, indicates whether a same key index could be computed for two frames having different characteristics, and
   wherein based on determining that the first key index is associated with a collision entry of the collision entry table:
   compute a resolution value based on the set of characteristics of the frame;
   compare the computed resolution value to a set of resolution value entries of a collision resolution table; and
   determine a second key index based on a resolution value entry, of the resolution value entries, that includes information matching the computed resolution value; and
   determine a set of security parameters associated with the frame using the second key index.

2. The device of claim 1, wherein the first key index function includes at least one of a hash function, a cyclic redundancy check function, or a truncation function.

3. The device of claim 1, wherein the one or more processors, in association with determining the set of security parameters using the second key index, are configured to:
   compute a resolution value associated with the frame based on one or more characteristics of the frame;
   determine that the resolution value matches a stored resolution value corresponding to a collision resolution entry; and
   determine the set of security parameters associated with the frame based on the second key index.

4. The device of claim 3, wherein the one or more processors, when computing the resolution value, are configured to compute the resolution value based on the one or more characteristics and using a second key index function that is different from the first key index function.

5. The device of claim 4, wherein the second key index function includes at least one of a hash function or a cyclic redundancy check function.

6. The device of claim 3, wherein the one or more processors, when computing the resolution value, are configured to compute the resolution value based on identifying a slice from the one or more characteristics according to a slice offset.

7. The device of claim 1, wherein the one or more processors are further configured to:
   compute a flow identifier associated with the frame;
   determine a stored flow identifier corresponding to the second key index; and
   selectively accept the frame based on a determination of whether the computed flow identifier matches the stored flow identifier.

8. The device of claim 1, wherein the one or more processors are further configured to:
   compute a flow identifier associated with the frame;
   determine a required frame type for the frame based on the flow identifier;
   identify an actual frame type of the frame; and
   selectively accept the frame based on a determination of whether the actual frame type matches the required frame type.

9. A device, comprising:
   one or more processors configured to:
   identify a set of characteristics associated with a frame;
   compute a flow identifier associated with the frame based on the set of characteristics;
   determine a key index associated with the frame, wherein the key index is determined based on:
   computing a first key index associated with the frame based on the set of characteristics and based on a first key index function,
   wherein based on determining that the first key index is associated with an entry of a collision entry table:
   compute a resolution value based on the set of characteristics of the frame;
   compare the computed resolution value to a set of resolution value entries of a collision resolution table; and
   determine a second key index as the key index based on a resolution value entry, of the resolution value entries, that includes information matching the computed resolution value;
   determine a stored flow identifier corresponding to the key index,
   wherein the flow identifier defines a connection path between two layers or nodes, and
   wherein the flow identifier is determined by hashing one or more addresses; and
   selectively accept the frame based on a determination of whether the computed flow identifier matches the stored flow identifier.

10. The device of claim 9, wherein the one or more processors are further configured to:
    determine a required frame type for the frame based on the flow identifier;
    identify an actual frame type of the frame; and selectively accept the frame based on a determination of whether the actual frame type matches the required frame type.

11. The device of claim 9, wherein the one or more processors are further configured to determine a set of security parameters associated with the frame using the second key index.

12. The device of claim 9, wherein the first key index function includes at least one of a hash function, a cyclic redundancy check function, or a truncation function.

13. The device of claim 9, wherein the one or more processors, when computing the resolution value, are configured to compute the resolution value based on at least one characteristic of the set of characteristics and using a second key index function that is different from the first key index function.

14. The device of claim 9, wherein the one or more processors, when computing the resolution value, are configured to compute the resolution value based on identifying a slice from at least one characteristic of the set of characteristics according to a slice offset.

15. A method, comprising:
identifying, by a device, a set of characteristics of a frame;
computing, by the device, a first index associated with the frame based on the set of characteristics and using a first index function;
determining, by the device, whether the first index is associated with any collision entries from a set of collision entries,
  wherein the set of collision entries are generated and stored,
  wherein a collision entry, of the set of collision entries, indicates whether a same key index could be computed for two frames having different characteristics, and
  wherein based on determining that the first index is associated with a collision entry of a collision entry table:
    compute a resolution value based on one or more characteristics of the frame;
    compare the computed resolution value to a set of resolution value entries of a collision resolution table; and
    determine a second index based on a resolution value entry, of the resolution value entries, that includes information matching the computed resolution value; and
determining, by the device, a set of parameters associated with the frame using a particular index, wherein the particular index is either:
  the first index when the first index is not associated with any collision entries from the set of collision entries, or
  the second index when the first index is associated with a collision entry from the set of collision entries.

16. The method of claim 15, further comprising:
computing a flow identifier associated with the frame;
determining a stored flow identifier corresponding to the particular index; and
selectively accepting the frame based on a determination of whether the computed flow identifier matches the stored flow identifier.

17. The method of claim 15, further comprising:
computing a flow identifier associated with the frame;
determining a required frame type for the frame based on the flow identifier;
identifying an actual frame type of the frame; and
selectively accepting the frame based on a determination of whether the actual frame type matches the required frame type.

18. The device of claim 9, wherein the first key index function includes at least one of a hash function, a cyclic redundancy check function, or a truncation function.

19. The device of claim 13, wherein the second key index function includes at least one of a hash function or a cyclic redundancy check function.

20. The method of claim 15, wherein the resolution value is computed based on the set of characteristics and using a second index function that is different from the first index function.

* * * * *